July 29, 1924.

J. MATHIESON

CARPENTER'S MITER

Filed Aug. 5, 1922

1,502,735

Inventor.
J. Mathieson,
By Egerton R. Case,
Atty.

Patented July 29, 1924.

1,502,735

UNITED STATES PATENT OFFICE.

JAMES MATHIESON, OF TORONTO, ONTARIO, CANADA, ASSIGNOR OF ONE-HALF TO ROBERT MORTON HILDITCH, OF TORONTO, ONTARIO, CANADA.

CARPENTER'S MITER.

Application filed August 5, 1922. Serial No. 579,812.

*To all whom it may concern:*

Be it known that I, JAMES MATHIESON, a subject of the King of Great Britain, residing in the city of Toronto, county of York, Province of Ontario, Canada, have invented certain new and useful Improvements in Carpenters' Miters, of which the following is a specification.

My invention relates to improvements in carpenters' miters, and the object of my invention is to provide a tool of the class set forth by means of which the angle or angles at which it is desired to cut a board, scantling, or other member, adapted to be used in building operations, may be quickly ascertained, and the cut effected at the said angle or angles, with accuracy, and in the following specification I shall describe a disclosure within my invention, and what I claim as new will be set forth in the claim forming part of this specification.

Figure 1:
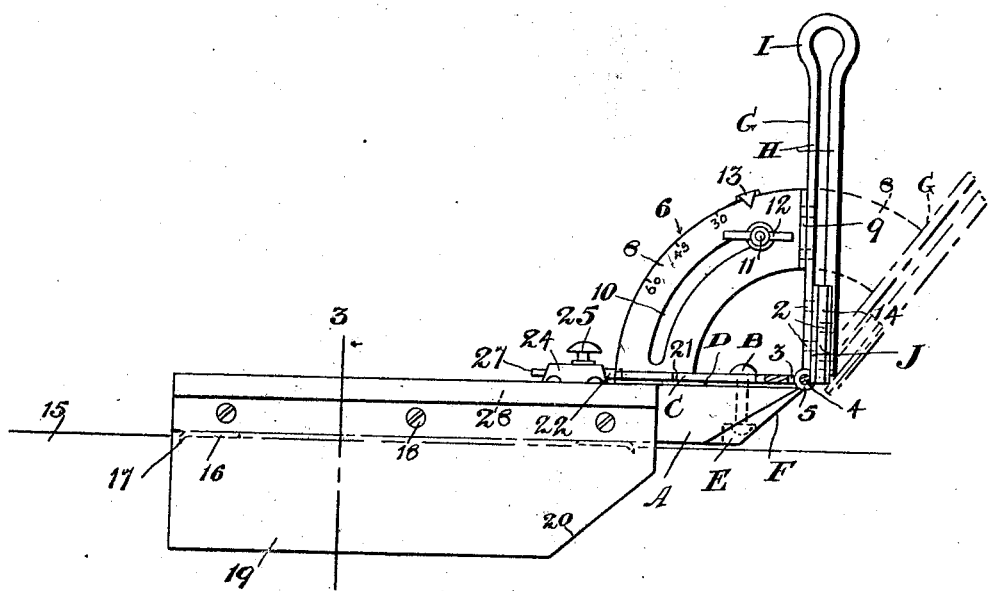
Figure 2:
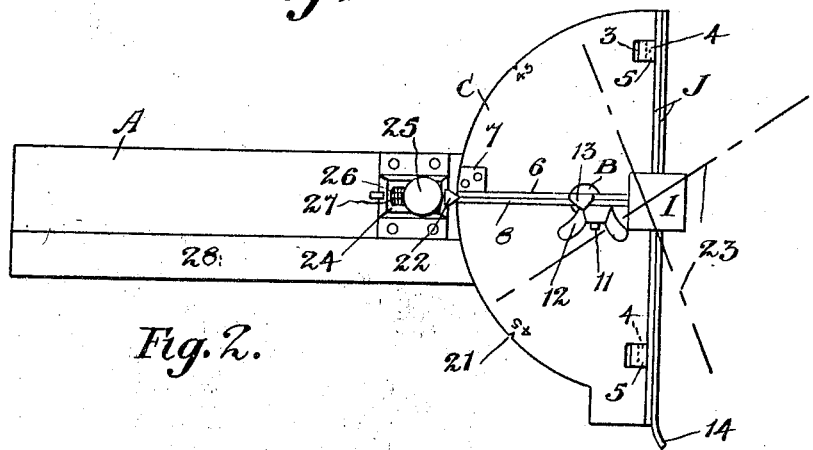
Figure 3:
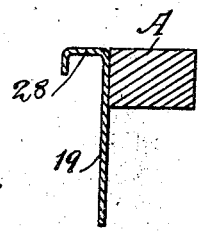

Fig. 1 is a side elevation of my preferred form of tool, showing the same mounted for use on a wooden member it is desired to cut. Fig. 2 is a plan view of the tool, and Fig. 3 is a vertical cross-section on the line 3—3, Fig. 1.

In the drawings, like characters of reference refer to the same parts.

According to the construction disclosed my tool comprises a body-portion A to one end of which is pivoted as shown at B a horizontal quadrant C. Interposed between the quadrant C and the body-portion A, I show a metal plate D suitably secured to said body-portion against which the quadrant C has movement, though this plate may be omitted if desired. The lower end of the pivotal means B is preferably countersunk in the body-portion A as shown at E so that the associated end of said body-portion may be cut away at an angle as shown at F so that this body-portion will not interfere with the action of the saw in different angular positions. G is the saw guide, and the same comprises two plates H which are held in co-operative relationship by means of the loop I or its equivalent. Suitably coupled to each of the plates H, is a plate J, preferably made of brass or other relatively soft material that will not rust, and that will not injure the saw blade. These plates are preferably riveted each to its associated plate H as shown at 2, or otherwise secured thereto. Stamped in the quadrant C are holes 3 thus forming bars or pintles 4 at the outer side thereof around which are bent lugs 5 stamped from the lower edge of the inner plate J, thus forming a hinged connection between the saw guide G and the quadrant C. 6 is a segmental-shaped plate which is secured at its lower end to the quadrant C, after any suitable manner: the construction shown for this purpose comprises a foot-piece 7 forming part of this plate and bent at an angle thereto and suitably riveted or otherwise secured to the quadrant C (Fig. 2). 8 is a segmental-shaped plate or quadrant operating adjacent one side of the plate 6, and this plate or quadrant 8 is suitably secured to the inner plate H of the saw guide G by any suitable means 9, similar to the foot-piece 7. The plate or quadrant 8 is provided with a segmental slot 10, and has the desired degrees stamped thereon. Carried by the plate 6 is a threaded pin 11 which projects through the slot 10, and screwing on the threaded end of this pin is a thumb nut 12, by means of which the segmental plate or quadrant 8 is held in the desired position. Since this segmental plate or quadrant 8 is fixedly associated with the saw guide G, when this saw guide is moved around the bars or pintles 4, the plate or quadrant 8 of course will be moved. 13 is a pointer associated with the plate 6 so that the user of the tool may position the saw guide G, through the medium of the plate or quadrant 8 in the desired angle, in which position it is held by means of the thumb nut 12.

The plates J pass between the plates H and extend a sufficient distance beyond each side of the saw guide G to provide the desired support for the saw blade. One end of one of the plates J projects beyond the quadrant C and is bent outwardly, as shown at 14, so as to permit the saw blade to be readily inserted between the plates J.

Suitably secured to one side of the body-portion A as by means of screws 18 is a metal plate 19 which depends below said body-portion and one of the functions of this plate 19 is to permit the tool to be readily positioned for accurate use. In other words, when the body-portion A is placed upon the member 15 to be cut, the plate 19 is faced up against the side of said member 15, and this insures that when the plates J are in the position shown in Figs. 1 and 2, they will be substantially at right angles to the member 15, and consequently the end of this member may be cut off at this angle.

Secured to the underside of the body-portion A are plates 16 provided with teeth 17 which enter the member 15 to prevent the longitudinal displacement of the tool.

If it be desired to cut the end of the member 15 at any other angle, the saw guide H will be moved into the dotted position shown in Fig. 1.

The corner 20 of the plate 19 is cut away so as not to interfere with the saw blade in making certain angular cuts.

The quadrant C is also provided with degrees, and is preferably notched as shown at 21 so that by means of the co-action of a bolt 22 with this quadrant, the angular disposition of the plates J may be secured, as indicated by dotted lines 23 in Fig. 2.

The bolt 22 or its equivalent is mounted within a housing 24 and is provided with a thumb piece 25 projecting through the slot 26 formed in said housing. The spring 27 mounted on said bolt and within said housing keeps said bolt in its operative position.

Without further elaboration, it will be understood by one skilled in the art how the plates 6 can be given the desired angular adjustments to obtain the desired angular cut.

Further use of the plate 19 is to permit the tool to be used in sawing thin stuff, such as base boards, and to adapt this plate for this purpose the upper end thereof is provided with an inverted channel 28 projecting beyond one side of the plate. By means of this channel the tool is rested upon the thin stuff, and the desired cut obtained, as before-described.

Obviously I may make my tool without the quadrant or the segmental plate 8, but in such case the scope of utility of the tool would be considerably limited.

While I have described what I consider to be the best embodiment within my invention, it must be understood that the principle thereof may be embodied in various other forms and I desire not to be limited beyond the requirements of the prior art and the terms of my claim.

What I claim is:

A tool of the class described comprising a body-portion adapted to be placed upon the wooden member to be cut; a quadrant horizontally pivoted to one end of said body-portion; a saw-guide; a pair of plates associated with said saw guide and between which a saw blade is designed to operate, the inner of said plates having a hinged connection with the forward edge of said quadrant; a vertically-disposed segmental plate or quadrant associated with said saw guide to permit said guide to be moved into any angular position out of the vertical; means co-acting with said segmental plate or quadrant and said body-portion to permit the former to function, and a plate provided at its upper portion with an inverted U-shaped channel laterally carried by said body-portion and extending longitudinally thereof and depending therebelow.

JAMES MATHIESON.